US010502343B2

(12) United States Patent
Juzak et al.

(10) Patent No.: US 10,502,343 B2
(45) Date of Patent: Dec. 10, 2019

(54) PIPE HANGER

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 16/463,699

(22) PCT Filed: Nov. 28, 2017

(86) PCT No.: PCT/NL2017/050789
§ 371 (c)(1),
(2) Date: May 23, 2019

(87) PCT Pub. No.: WO2018/101820
PCT Pub. Date: Jun. 7, 2018

(65) Prior Publication Data
US 2019/0285200 A1 Sep. 19, 2019

(30) Foreign Application Priority Data
Nov. 30, 2016 (NL) ..................................... 2017894

(51) Int. Cl.
F16L 3/11 (2006.01)
H02G 3/00 (2006.01)
(Continued)

(52) U.S. Cl.
CPC . F16L 3/11 (2013.01); F16L 3/12 (2013.01); F16L 3/13 (2013.01); F16L 3/133 (2013.01);
(Continued)

(58) Field of Classification Search
CPC ....... F16L 3/11; F16L 3/12; F16L 3/13; F16L 3/14; F16L 3/133; F16L 3/137; H02G 3/263
(Continued)

(56) References Cited

U.S. PATENT DOCUMENTS 940,555 A * 11/1909 Read .................. H02G 7/10
248/61
1,579,419 A * 4/1926 Tomkinson ............... F16L 3/14
248/59
(Continued)

FOREIGN PATENT DOCUMENTS

DE 3615658 A1 * 8/1987 ............ F16L 3/1211
DE 3608071 A1 * 9/1987 ................ F16L 3/11
(Continued)

OTHER PUBLICATIONS

International Search Report and Written Opinion for corresponding International Application No. PCT/NL2017/050789, dated Feb. 19, 2018 (13 pages).
(Continued)

Primary Examiner — Eret C McNichols
(74) Attorney, Agent, or Firm — Hoffmann & Baron, LLP

(57) ABSTRACT

A pipe hanger for supporting a pipe includes a suspension part and a substantially U-shaped hanger part. The hanger part includes a loop portion with two limbs which are resiliently moveable towards each other, each limb including an outwardly extending hook portion at an end thereof for suspending the hanger part, in use, from the suspension part. The suspension part includes a base and two legs. The suspension part being adapted to be connectable with a suspension rod at the base of the suspension part. The legs each extend from the base towards a distal end remote from the base. Both legs include an opening to receive the hook portion of the hanger part. A spacing between the inner sides
(Continued)

of the distal ends of the legs of the suspension part is smaller than or equal to the spacing between outward extremities of the hook portions of the hanger part.

9 Claims, 11 Drawing Sheets

(51) Int. Cl.
    *F16L 3/14*     (2006.01)
    *F16L 3/133*     (2006.01)
    *F16L 3/13*     (2006.01)
    *F16L 3/137*     (2006.01)
    *F16L 3/12*     (2006.01)

(52) U.S. Cl.
    CPC ............... *F16L 3/137* (2013.01); *F16L 3/14* (2013.01); *H02G 3/263* (2013.01)

(58) Field of Classification Search
    USPC ...... 248/58–63, 65, 67.7, 68.1, 69, 73, 74.1, 248/74.2, 74.3, 74.4
    See application file for complete search history.

(56) References Cited

U.S. PATENT DOCUMENTS

| | | | |
|---|---|---|---|
| 1,698,571 A | | 1/1929 | Van Cleve |
| 2,466,247 A | * | 4/1949 | Land .......... F16L 3/14 248/62 |
| 2,835,464 A | * | 5/1958 | Kolodin .......... F16L 3/14 248/62 |
| 2,923,509 A | * | 2/1960 | Kolodin .......... F16L 3/11 248/62 |
| 3,295,806 A | * | 1/1967 | Modeme .......... F16L 3/1008 248/74.4 |
| 3,302,912 A | * | 2/1967 | Hurlburt, Jr. .......... F16K 27/00 248/65 |
| 4,934,634 A | * | 6/1990 | Breeden, Jr. .......... F16L 3/14 248/59 |
| 2004/0135038 A1 | * | 7/2004 | Barton .......... F16L 3/133 248/59 |
| 2007/0040075 A1 | * | 2/2007 | Moretto .......... F16L 3/1066 248/67.7 |
| 2015/0252916 A1 | * | 9/2015 | Heath .......... E04B 1/38 52/745.21 |
| 2019/0017630 A1 | * | 1/2019 | Juzak .......... F16L 3/11 |
| 2019/0072213 A1 | * | 3/2019 | Kerlin .......... F16L 3/16 |

FOREIGN PATENT DOCUMENTS

| | | | | |
|---|---|---|---|---|
| DE | 4108432 A1 | * | 9/1992 | ............ F16L 3/14 |
| EP | 0473213 A1 | * | 3/1992 | ............ F16L 3/12 |
| FR | 2385966 A1 | * | 10/1978 | ............ F16L 3/10 |
| GB | 2241040 A | | 8/1991 | |
| JP | 2943068 B1 | * | 8/1999 | ............ F16L 3/006 |
| WO | 2015/149128 A1 | | 10/2015 | |

OTHER PUBLICATIONS

European Search Report and Written Opinion for Netherlands Application No. NL 2017894, dated Jul. 21, 2017 (8 pages).

* cited by examiner

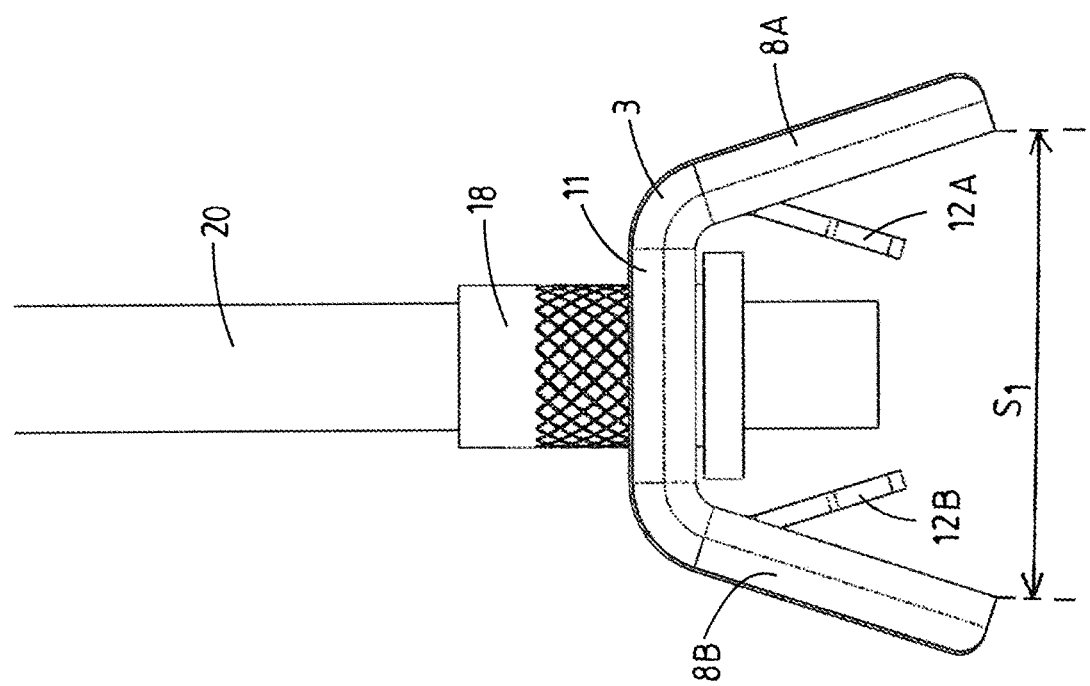

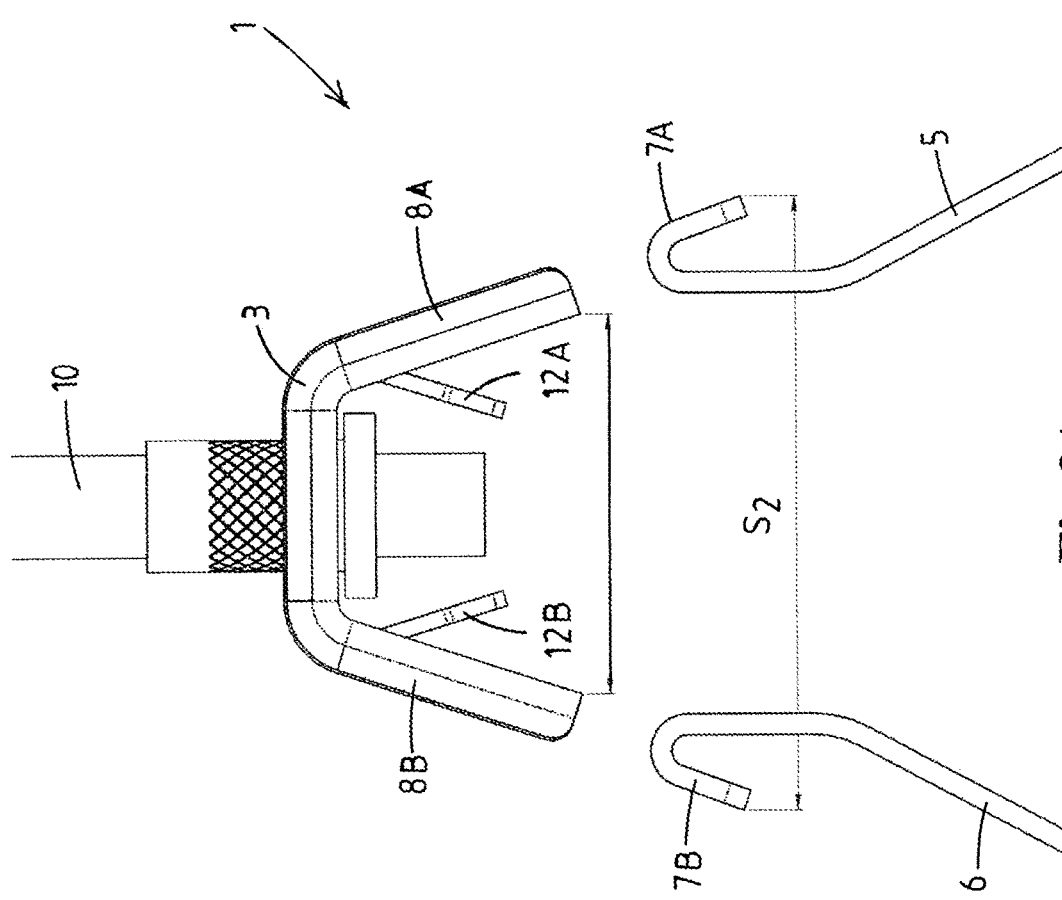

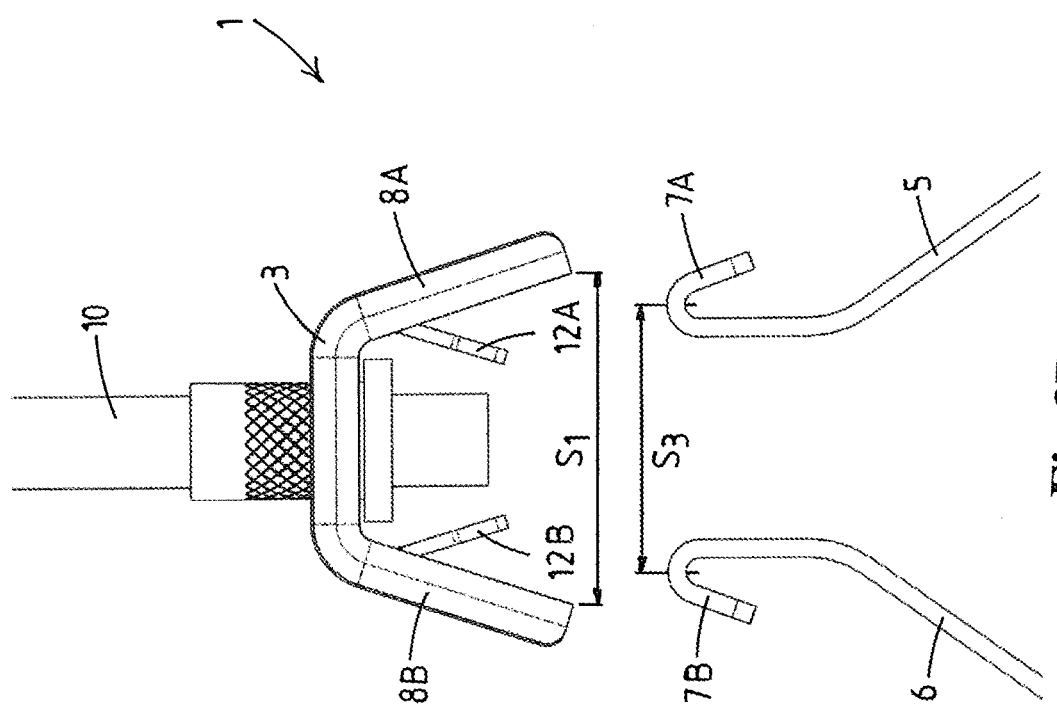

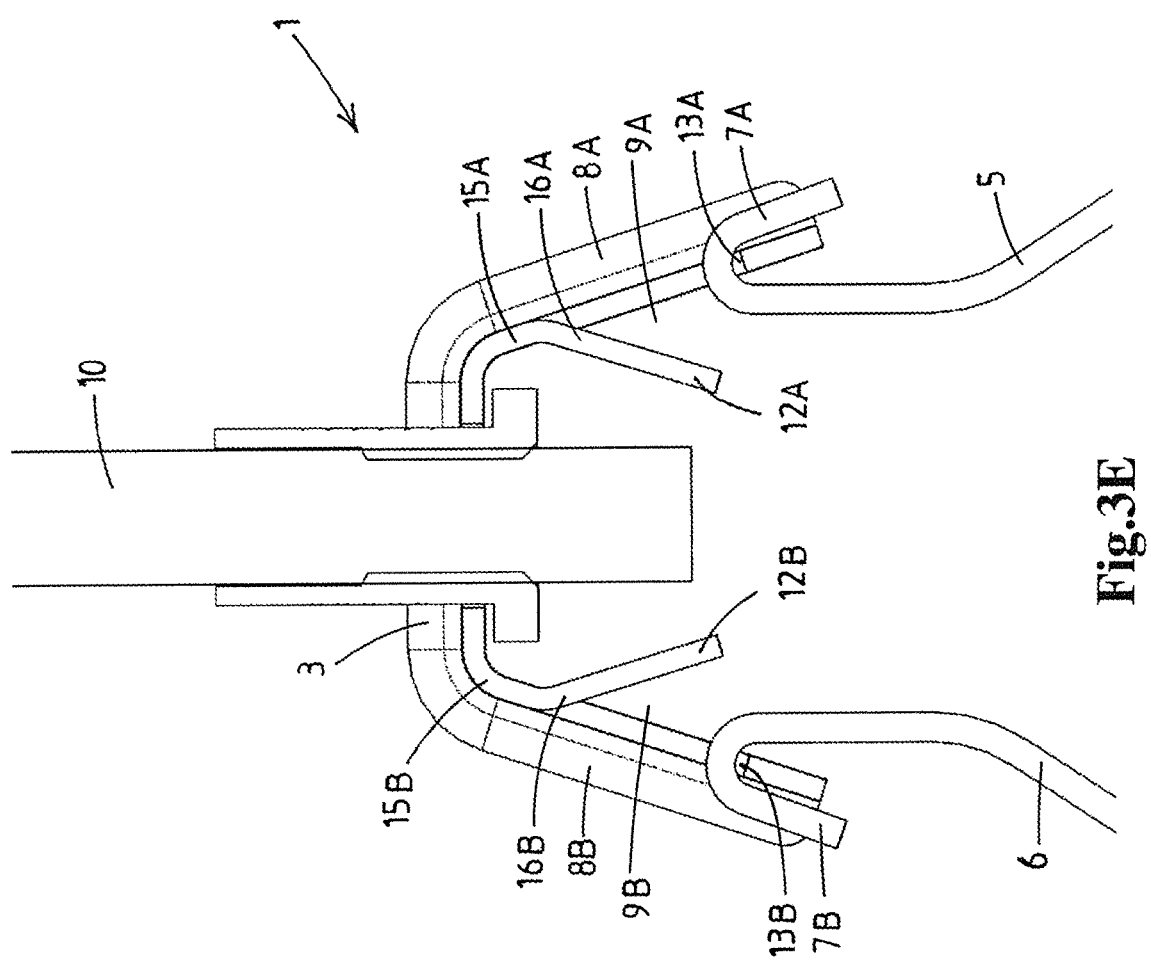

PIPE HANGER

CROSS-REFERENCE TO RELATED APPLICATIONS

This application is the National Stage of International Application No. PCT/NL2017/050789, filed Nov. 28, 2017, which claims the benefit of Netherlands Application No. NL 2017894, filed Nov. 30, 2016, the contents of which is incorporated by reference herein.

FIELD OF THE INVENTION

The present invention relates to a pipe hanger for supporting a pipe or the like. The pipe hanger comprises a suspension part and a substantially U-shaped hanger part. The hanger part, in use, is arranged around the pipe, said hanger part comprising a loop portion with two limbs, which limbs are resiliently moveable towards each other, each limb comprising an outwardly extending hook portion at an end thereof for suspending the hanger part, in use, from the suspension part. Said suspension part comprises two legs, both legs comprising an opening to receive the hook portion of the hanger part, the spacing between the legs of the suspension part, in an unloaded state, being smaller than the spacing between the hook portions of the hanger part. The suspension part is adapted to be connectable with a suspension rod at a base of the suspension part.

In particular the invention relates to a pipe hanger for supporting a pipe or the like.

BACKGROUND OF THE INVENTION

GB2241040 shows a pipe hanger to support a pipe or the like from a drop rod. This pipe hanger comprises a saddle portion and a U-shaped support portion. The saddle portion comprises a base and legs, said legs containing slots and tags at the upper sides of the slots, facing outwardly. The support portion comprises upper ends that can be compressed together and which upper ends, when they are pressed together by a sufficient amount, can be received between the legs of the saddle portion. When moving the upper ends of the support portion towards the base of the saddle portion, the upper ends can snap outwardly and hook in the slots in the support legs. The tags at the upper side of the slot retain the ends of the support portion in the legs. The pipe hanger further has a threaded connector arranged to suspend the pipe hanger.

One of the disadvantages of currently known pipe hangers is the difficulty experienced when the hanger part is connected to the suspension part; especially when considering the fact that the hanger part carries a pipe and that this pipe is typically installed near a ceiling, or at least above head-height. Thus, while installing the pipe hanger, an installer must support the weight of the uninstalled pipe, while simultaneously handling the hanger part of the pipe hanger precisely. First, the installer must pull the ends of the hanger part apart to insert the pipe between these ends, causing internal stresses in the hanger part. Subsequently, the installer must compress the hanger parts again and move the hanger part up, with the pipe arranged inside the hanger part, towards the suspension part. The upper ends of the hanger part must be positioned at the slots in the legs of the suspension part, such that the upper ends ultimately hook into the slots to suspend the pipe hanger (and thus the pipe) from the suspension part. To position the upper ends of the hanger part relative to the slots in the suspension part requires a precise movement, which requires a great amount of coordination when the pipe is installed above head-height and when the weight of the pipe must also be supported. Thus, installation of such a pipe hanger is a relatively complex task.

An object of the present invention is to provide a pipe hanger that is more easily installed.

SUMMARY OF THE INVENTION

This object is achieved by a pipe hanger according to the invention, wherein the suspension part is provided with guiding tabs, said guiding tabs extending inwardly with respect to the legs, said guiding tabs being bent away from the legs, such that, when the limbs of the hanger part are introduced between the legs of the suspension part and moved upwards, the legs of the suspension part initially resiliently force the limbs of the hanger part towards each other and, subsequently, the guiding tabs of the suspension part catch the limbs of the hanger part and guide them outwardly, to move them away from each other, guiding the respective hook portions of the limbs towards an edge of each respective opening in the legs, to arrange the hook portion around the edge of the opening, thereby suspending the hanger part from the suspension part.

The application of guiding tabs makes the pipe hanger easier to use during installation. The guiding tabs ensure that, as the hanger part is moved upwardly towards the suspension part, the hanger part and the suspension part automatically click together. While moving the hanger part upwardly during installation, the installer will feel some resistance when the guiding tabs catch the hook portions. When that resistance is felt, the installer knows that the hook portions are in the right place and that they are automatically guided towards the opening in the legs. For this guiding function of the guiding tabs, it is beneficial that the hook portions of the hanger part, in their relaxed position, are spaced further apart than the legs of the suspension part. During installation, the installer then must compress the limbs of the hanger part, giving them the natural tendency to move outwards, towards their relaxed position. This makes it easier to hook the hook portions of the limbs into the opening of the legs.

An advantage of attaching the hanger part to the suspension part from the inside, with hook portions of the hanger part that have a larger spacing in their relaxed position than the spacing between the legs of the suspension part, is that the limbs of the hanger part, in their mounted position, have a natural tendency to move outwardly, towards their relaxed position. Thus, when the pipe is installed and when an accidental impact force causes the pipe hanger to move up with respect to the suspension part, i.e. when the hooks of the hanger part are no longer hooked around an edge of the opening but temporarily float in the opening, the limbs still have the tendency to move outwards. Accidental disengagement of the suspension part and the hanger part during such an accidental impact force is thereby prevented: in order to disengage the two parts once they are installed, the limbs of the hanger part should be moved inwardly with respect to the legs of the suspension part; against this natural movement direction. This is an advantage, as pipe hangers are rarely de-installed. Their main goal is to stay in place throughout their lifetime.

According to a preferred embodiment, the guiding tabs are connected to an upper edge of the opening in the legs of the suspension part. In this embodiment, the suspension part is for example produced using a sheet metal blank, which sheet metal part is processed in one or more steps to obtain the desired shape for the suspension part. One of these processing steps is to punch the sheet metal part, to obtain the openings in the legs. According to one production method, not all material of the opening is however removed during this punching step. According to this production method, the material of what will ultimately form the guiding tabs remains attached to the suspension part. This material is then bent inwardly to form the guiding tab. A particular advantage of this production method is that the suspension part can be made from a single piece of material, with relatively few steps. Thus, the guiding tab and the corresponding opening are formed by a cut-out in the leg of the suspension part, which cut-out defines the contour of the opening and of the guiding tab.

In an alternative embodiment, the guiding tabs are connected to an upper side of the suspension part. Regarding the functionality of the guiding tabs, there is no difference between a guiding tab that is connected to an edge of the opening in the legs or a guiding tab that is connected to an upper side of the suspension part. Using the above outlined production method however, the first option is preferred as it allows for a faster and easier production and thus leads to a cheaper product.

According to a further preferred embodiment of the invention, the suspension part is made from a resilient material, in particular from spring steel, but optionally also carbon fibre, wood, Polyoxymethylene, etc. can be used. When the guiding tabs are made from a resilient material, they become more flexible/resilient compared to when they are made from a more conventional material such as a steel or an aluminium. When the guiding tabs are more flexible, hooking of the hook portion of the hanger part around the edge of the opening in the legs is made more easy: when the guiding tabs catch the hook portions of the hanger part, they will bend inwardly, away from the corresponding leg, due to the upwards force introduced by the hook portions. It can be said that the guiding tab hinges with respect to the upper edge of the opening in the suspension part. This resiliency of the guiding tab makes the opening in the legs of the suspension part more accessible, resulting in an easier installation.

When the legs of the suspension part are made from a resilient material, hooking of the hook portion of the hanger part around the edge of the opening in the legs also is made more easy: when the hook portions of the hanger part are introduced between the legs of the suspension part, the legs of the suspension part will resiliently move outwards due to the force introduced on them by the hook portions of the hanger part. It can be said that the legs of the suspension part hinge with respect to the upper, relatively stiff part of the suspension part. This temporarily makes the opening in the legs of the suspension part more accessible, resulting in an easier installation.

When the suspension part is entirely made from a resilient material, for example via the previously described production method from one (flat) part of spring steel, both the guiding tabs and the legs are made of said resilient material. Thus, when the limbs of the hanger part are introduced between the legs of the suspension part and moved upwards, first the legs of the suspension part are pushed outwards, making the opening in which the hook portions are to hook larger. Then, as the guiding tabs catch the hook portions of the limbs when the hanger part is further moved upwards, the guiding tabs are pushed inwards, making the opening in the legs of the suspension part even more accessible. Making the suspension part from a resilient material thus further facilitates the installation of the pipe hanger.

According to a further preferred embodiment of the invention, the hook portions of the hanger part are made from a resilient material, in a particular embodiment from spring steel, but alternatively from carbon fiber, wood, Polyoxymethylene, etc. When the hook portions of the hanger part are made from a resilient material, the hook portion of the hanger part will be compressed towards the limbs of the hanger part as the hanger part is introduced into the suspension part and moved upwards. As the limbs are introduced between the legs of the suspension part, these limbs resiliently move towards each other. When the hook portion is made from a resilient material, the hook portion of the hanger part is also resiliently forced inwardly relative to the limb of the hanger part. This effectively results in a narrower width between the hook portion and the limb, thus requiring a smaller space between the guiding tab and the opening in the legs to enable the hook portion to hook around the edge of that opening. When the space between the guiding tab and the opening in the legs is smaller, it is more difficult to (accidentally) disengage the hanger part and the suspension part. This is an advantage, as pipe hangers are rarely de-installed. Their main goal is to stay in place throughout their entire lifespan.

Possibly, also the limbs of the hanger part are made from a resilient material to further reduce the required space between the guiding tab and the opening in the legs.

According to a further preferred embodiment, the suspension part comprises a base and legs, said base, in mounted position, being arranged substantially perpendicular to a central axis of the threaded rod, said legs of the suspension part being angled with respect to the base of the suspension part, and, in their mounted position, extend substantially downwards. In the preferred embodiment, the legs of the suspension part are arranged in such a way that they point outwards in the mounted position of the pipe hanger; the spacing between the legs of the suspension part thus being wider at the bottom of the suspension part (in mounted position) than near the base of the suspension part. In this preferred embodiment, the shape of the suspension part is best described as trapezium-like.

In an alternative embodiment the legs of the suspension part, in their mounted position, point substantially downwards, the width between the legs at the bottom of the suspension part and near the base of the suspension part being approximately the same. In this alternative embodiment, the shape of the suspension part is best described as U-shaped.

The base of the suspension part may be generally straight, but may also be curved, for example semi-cylindrical.

According to a preferred embodiment of the invention, each respective edge of the opening in the suspension part around which the respective hooks of the hanger part are arranged, is substantially straight. When this edge is straight, the hook portion of the hanger part is optimally secured in the opening of the suspension part: the hook portion contacts the edge completely. The edge can however alternatively also be curved, for example convex or concave.

The opening in the legs of the suspension part may be of any desired shape. The opening may for example be wider near the base of the suspension part than remote from the base of the suspension part, or the opening may be narrower near the base of the suspension part than remote from the base of the suspension part. The opening may also be of a rectangular shape, or of a more curved shape. Preferably, the openings in both legs of the suspension part are of the same shape.

According to a further preferred embodiment of the invention, each respective guiding tab of the suspension part can be bent towards its respective leg after the hanger part is suspended from the suspension part with fingers of an installer, i.e. without the need of any tool. If the guiding tabs are bent towards the legs of the suspension part, they effectively close the opening in the legs. Once the hanger part of the pipe hanger is suspended from the suspension part, this is advantageous as it is then virtually impossible to accidentally disengage the suspension part from the hanger part. With these inwardly bendable tabs it is also more difficult to purposely release the hanger part and the suspension part, however, in practice this is rarely needed. Preferably the guiding tabs can easily be bent inwards without the need of a special tool. More particularly, it is preferred that the guiding tabs can be bent inwards with fingers of an installer. This installer does then not require to carry extra tools.

According to a further preferred embodiment of the invention, the guiding tabs of the suspension part comprise a connecting portion and an end portion, the connecting portion and the end portion being angled with respect to each other, wherein the connecting portion lies in the same plane as the legs of the suspension part and the end portion extends inwardly with respect to the legs. Especially when the opening is relatively large compared to the size of the hook portion of the hanger part, it is beneficial to have a connecting portion that extends in the same plane as the legs of the suspension part. This limits the freedom of movement of the hook portions in the opening once the pipe hanger is installed.

According to a further preferred embodiment of the invention, the base of the suspension part comprises a passage for a suspension rod, e.g. a threaded rod. To suspend the suspension part from a ceiling or the like, a suspension rod is typically used. Advantageously, the suspension part comprises an opening to make a connection between the suspension rod and the suspension part possible. The suspension part is for example fixed to the suspension rod with a hexagon nut, a flanged suspension nut, or other readily available nut types.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 schematically shows a front view of a first embodiment of a suspension part of a pipe hanger according to the invention, the suspension part being connected to a suspension rod.

FIG. 3A schematically shows a front view of the suspension part and an upper part of a hanger part of a pipe hanger according to the invention, where the suspension part is in an unloaded state.

FIG. 3B schematically shows a front view of a suspension part and an upper part of a hanger part of a pipe hanger according to the invention, in a first step of suspending the hanger part from the suspension part.

FIG. 3E schematically shows a front cross-sectional view of a suspension part and an upper part of a hanger part of a pipe hanger according to the invention, wherein the hanger part is suspended from the suspension part.

FIGS. 1 and 2A schematically show a suspension part 3, a substantially U-shaped hanger part 4, and a suspension rod 10. The pipe hanger 1 comprises a suspension part 3 and a hanger part 4, as visible in FIGS. 3A-3D. In use, the hanger part 4 is arranged around a pipe 2, as is visible in FIG. 2B, and the suspension part 3 is connected to the suspension rod 10.

DETAILED DESCRIPTION OF THE INVENTION

Figure 2A:
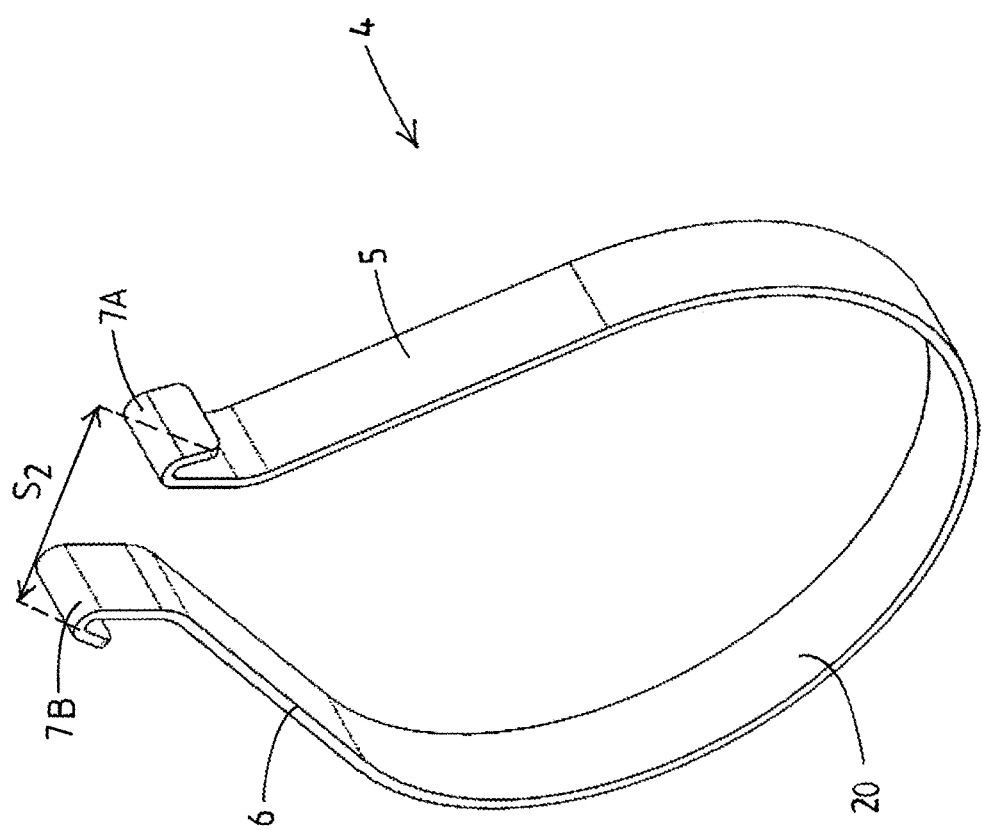
FIG. 2A schematically shows an isometric view of a hanger part of a pipe hanger according to the invention.
Figure 2B:
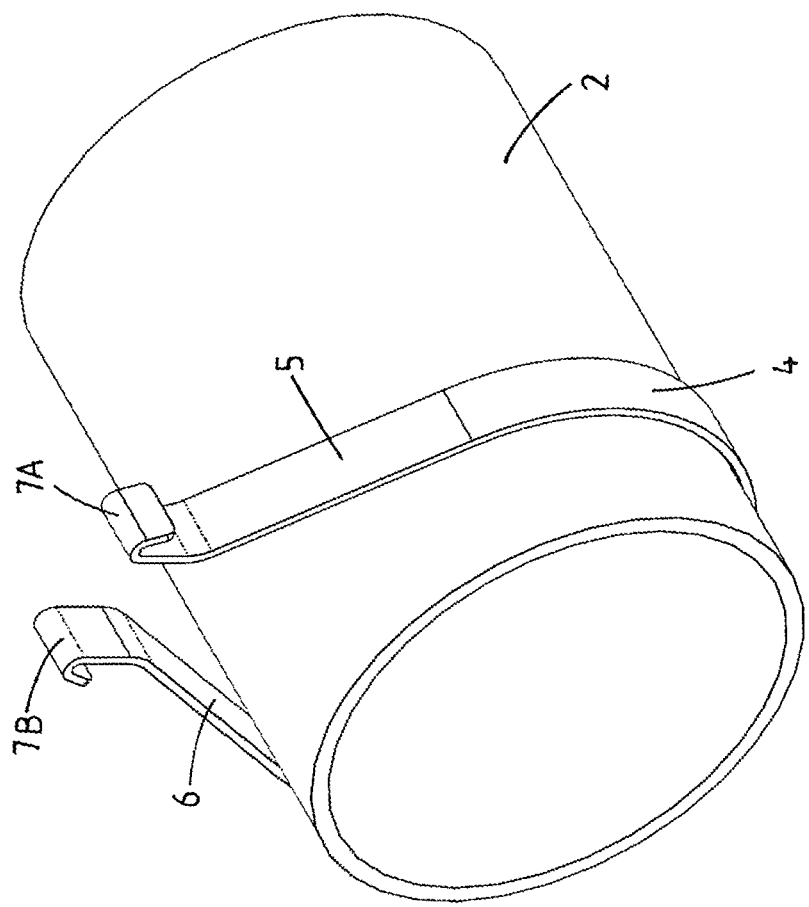
FIG. 2B schematically shows an isometric view of a hanger part of a pipe hanger according to the invention, wherein a pipe is arranged between the limbs of the hanger part.

The hanger part 4 comprises a loop portion 20 which loop portion is formed as an integral piece, with a substantially U-like shape. The hanger part 4 is closed at the bottom of the U-shape, and has an opening at the top of the U-shape. This allows a pipe to be introduced into the substantially U-shaped hanger part 4 via the opening near the top. The pipe 2 rests on the closed bottom of the hanger part 4. In the embodiment of FIGS. 2A and 2B, the loop portion 20 is formed as one part. The limbs 5, 6 of the loop portion 20 are made of a material with some resiliency, for example a metal, possibly steel, wood, carbon fiber, Polyoxymethylene, but in particular spring steel, such that the limbs 5, 6 are resiliently moveable towards and away from each other. At an end portion of the limbs 5, 6, on what is the upper side in FIGS. 2A and 2B, the limbs 5, 6 comprise a hook portion 7A, 7B. The hook portions 7A, 7B may be made of the same material as the limbs 5, 6, allowing the hanger part 4 to be made from a single piece, or the hook portions 7A, 7B may be made of another material than the limbs 5, 6. Both the limbs 5, 6 and the hook portions 7A, 7B may for example be made of a metal, such as steel or stainless steel. In an alternative embodiment, the limbs 5, 6 are made of another material, such as steel or stainless steel, while the hook portions 7A, 7B of the hanger part 4 are made of a resilient material, the benefit of which will become apparent when the installation of the hanger part 4 with respect to the suspension part 3 will be described. The hook portions 7A, 7B extend outwardly and, in use, help to suspend the hanger part 4 from the suspension part 3, as will be described in more detail further below with reference to FIGS. 3A-3D.

There is a certain spacing S2 between the outward extremities of the hook portions 7A, 7B of the hanger part 4, as can be seen in FIG. 3A.

In the embodiment of FIG. 2A, the hanger part 4 is shown in its unloaded state, the state of the hanger part 4 as it is produced, when no pipe 2 is arranged inside the hanger part 4, and when the hanger part 4 is not introduced inside the suspension part 3. The embodiment of FIG. 2B shows a hanger part 4 with a pipe 2 arranged between its limbs 5, 6. Generally, the pipe 2 is wider that the opening between the limbs 5, 6 of the hanger part 4. Upper parts of the limbs 5, 6 should thus be spread away from each other to allow the pipe 2 to be introduced in the hanger part 4. This spreading and subsequently closing of the upper parts of the limbs 5, 6, in combination with the U-shape of the hanger part 4, introduces natural stresses in the hanger part 4. Because of these natural stresses, the limbs 5, 6 of the hanger part 4 have the natural tendency to spread away from each other once the pipe 2 is arranged between the limbs 5, 6 of the hanger part 4.

Figure 4:
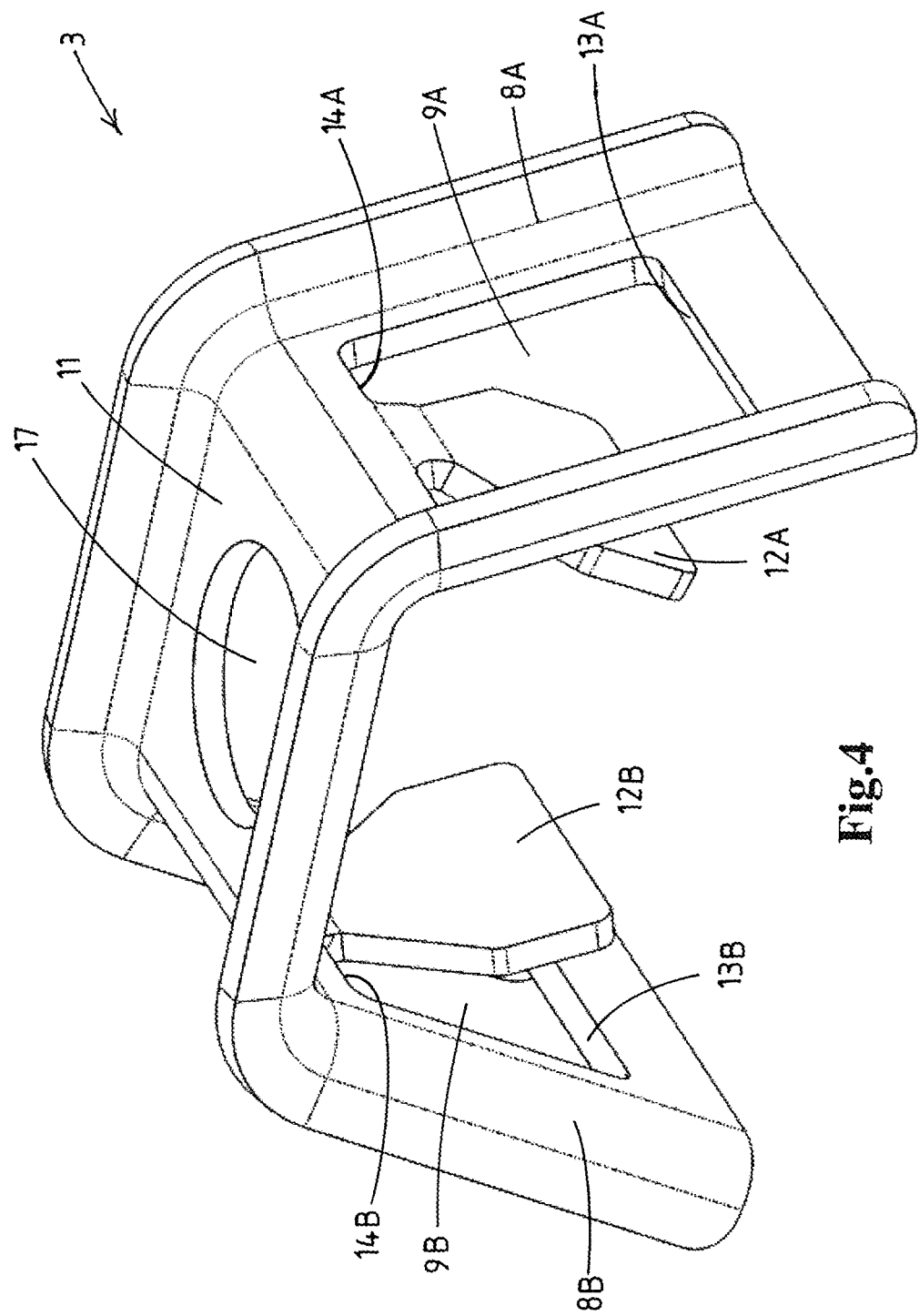
FIG. 4 schematically shows an isometric view of a first embodiment of a suspension part of a pipe hanger according to the invention.
Figure 5:
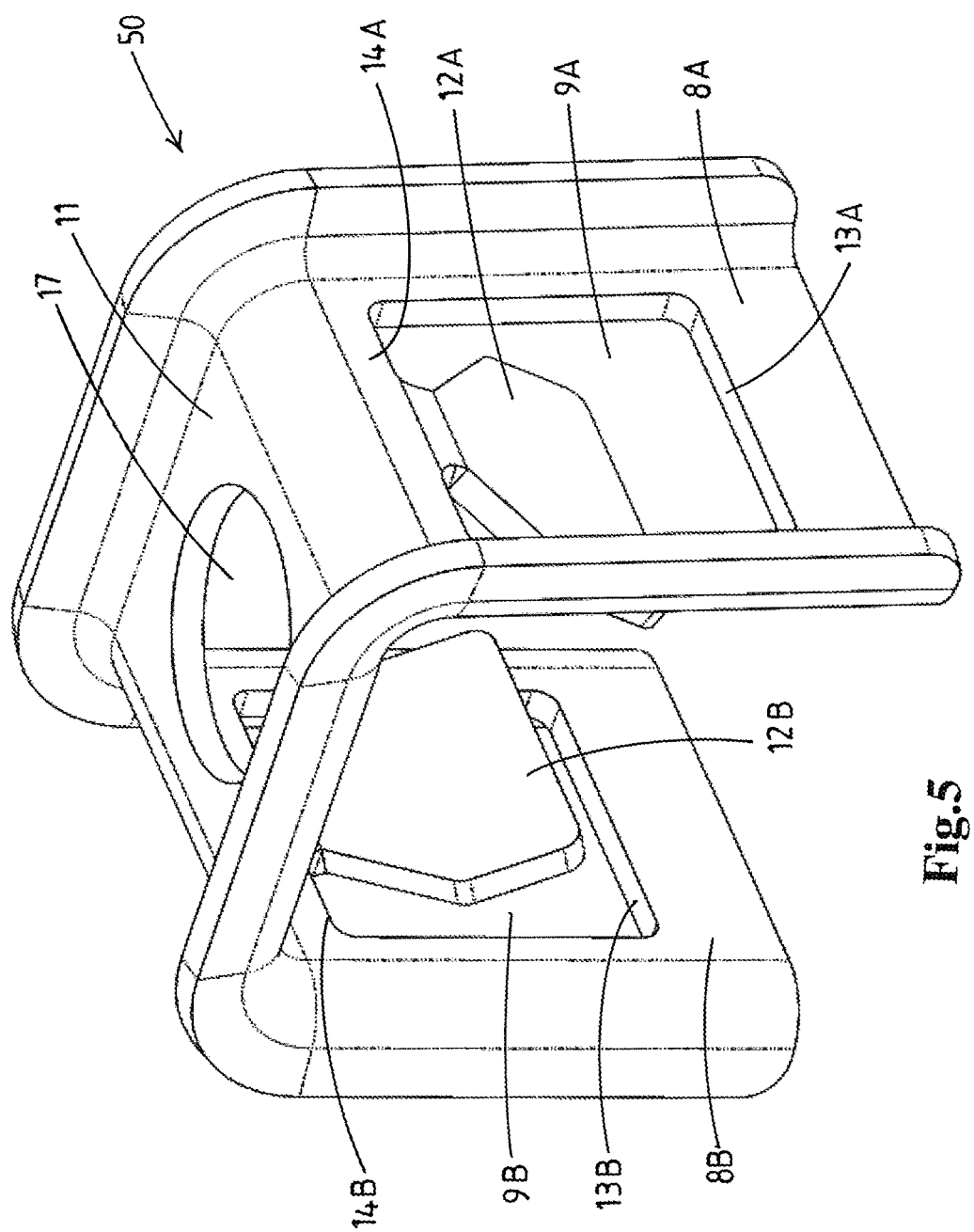
FIG. 5 schematically shows an isometric view of a second embodiment of a suspension part of a pipe hanger according to the invention.
Figure 6:
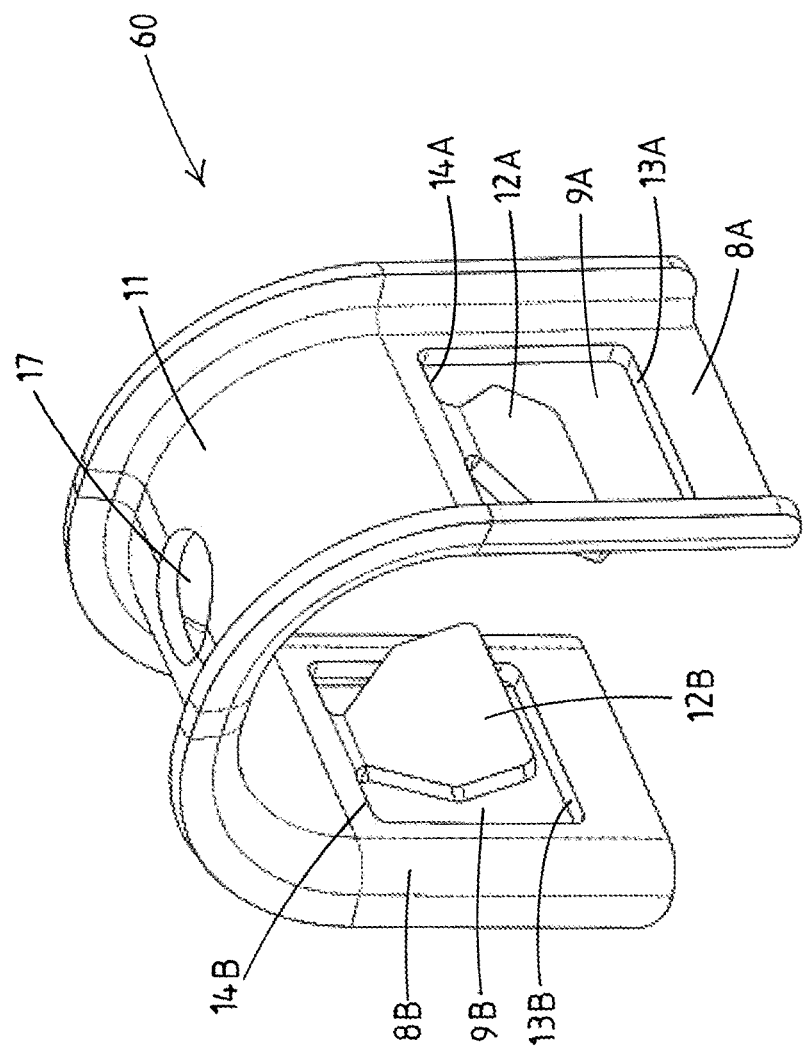
FIG. 6 schematically shows an isometric view of a third embodiment of a suspension part of a pipe hanger according to the invention.

The suspension part 3 comprises a base 11, two legs 8A, 8B, guiding tabs 12A, 12B, and openings 9A, 9B (not visible in FIG. 1, but for example visible in FIGS. 4-6). The guiding tabs 12A, 12B of the suspension part 3 extend inwardly with respect to the legs 8A, 8B, the guiding tabs 12A, 12B being bent out of the main plane of the legs 8A, 8B. The legs 8A, 8B extend from the base 11. There is a certain spacing S1 between the inner side of the distal ends of the legs 8A, 8B (i.e. the ends of the legs 8A, 8B remote from the base 11) of the suspension part 3, as is indicated in FIG. 1. In an unloaded state of the hanger part 4, the spacing S1 between the distal ends of the legs 8A, 8B of the suspension part 3 is smaller than the spacing S2 between the outer extremities of the hook portions 7A, 7B of the hanger part 4.

In the embodiment of FIG. 1, the suspension part 3 is connected with a suspension rod 10 at the base 11 of the suspension part 3 with a flanged suspension nut 18, but other types of nut can be used as well to connect the suspension part 3 to the suspension rod 10. One alternative nut is a hexagon nut, but many other types of nuts are readily available to make a connection between the suspension rod 10 and the suspension part 3.

FIGS. 4, 5 and 6 schematically show three different embodiments of the suspension part 3, 50, 60 in an isometric view. The suspension parts 3, 50, 60 all comprise a base 11, two legs 8A, 8B, and guiding tabs 12A, 12B. The guiding tabs 12A, 12B extend inwardly with respect to the legs 8A, 8B, the guiding tabs 12A, 12B being bent away from the legs 8A, 8B. All suspension part 3, 50, 60 have a certain spacing S1 between ends of the legs 8A, 8B of the suspension part 3, 50, 60. In an unloaded state of the hanger part 4, the spacing S2 between the hook portions 7A, 7B of the hanger part 4 is larger than the spacing S1 between the legs 8A, 8B of the suspension part 3, 50, 60. The suspension part 3 can be made of a metal, such as steel, stainless steel, or spring steel. The suspension part 3 can also be made of other materials, where the suspension part 3 should have enough strength to withstand the forces applied on it during the suspending of the hanger part 4, as will be described below with reference to FIGS. 3A-3D.

Further visible in FIGS. 4, 5, and 6 is that the legs 8A, 8B of the suspension part 3, 50, 60 each comprise an opening 9A, 9B. In use, these openings 9A, 9B will receive the hook portions 7A, 7B of the hanger part 4.

In the embodiments of FIGS. 4, 5, and 6, the openings 9A, 9B in the legs 8A, 8B of the suspension part 3, 50, 60 are substantially rectangular, with slightly rounded corners. Each opening 9A, 9B comprises four edges: an upper edge 14A, 14B, a lower edge 13A, 13B, and two side edges (not numbered). As the openings 9A, 9B in the embodiments of FIGS. 4, 5, and 6 are substantially rectangular, its edges 13A, 13B, 14A, 14B are substantially straight, including the respective lower edges 13A, 13B around which the hook portions 7A, 7B are to be arranged in use. It is not necessary that the opening 9A, 9B is substantially rectangular; its edges 13A, 13B, 14A, 14B may for example be curved instead of straight, having for example a convex or concave shape, or the lower edge 13A, 13B may have a different length than the upper edge 14A, 14B. The openings 9A, 9B have a similar shape in the shown embodiments, but they may also have a different shape.

In the embodiment of FIGS. 4, 5, and 6, the guiding tabs 12A, 12B are connected to the upper edge 14A, 14B of the opening 9A, 9B in the legs 8A, 8B of the suspension part 3. Alternatively, the guiding tabs 12A, 12B may for example be connected to the base 11 of the suspension part 3, extending inwardly with respect to the legs 8A, 8B, being bent away from the legs 8A, 8B. Yet alternatively, the guiding tabs 12A, 12B can be connected to the legs 8A, 8B of the suspension part 3, extending inwardly with respect to the legs 8A, 8B, being bent away from the legs 8A, 8B.

In the embodiments of FIGS. 4, 5, and 6, the suspension part 3, 50, 60 comprises a base 11 and two legs 8A, 8B, said base 11, in mounted position, being arranged substantially perpendicular to a central axis of the threaded rod 10, said legs 8A, 8B of the suspension part 3, 50, 60 being angled with respect to the base 11 of the suspension part 3, and, in their mounted position, extend substantially downwards. However, different shapes can still result, as is apparent from the FIGS. 4, 5, and 6.

The suspension part 3 in the embodiment of FIG. 4 can be described as being trapezium-shaped, where the spacing S1 between the legs 8A, 8B is larger near the bottom (the indicated position in FIG. 4), than near the base 11. The base 11 is substantially straight in the embodiment of FIG. 4, as are the legs 8B, 8A. The angle between the principle plane of the legs 8A, 8B and the principle plane of the base 11 is an obtuse angle.

The suspension part 50 in the embodiment of FIG. 5 can be described as being U-shaped, where the spacing S1 between the legs 8A, 8B is substantially the same near the bottom (the indicated position in FIG. 5), as near the base 11. The base 11 is substantially straight in the embodiment of FIG. 5, as are the legs 8B, 8A. The angle between the principle plane of the legs 8A, 8B and the principle plane of the base 11 is approximately 90 degrees.

The suspension 60 in the embodiment of FIG. 6 can be described as being U-shaped, where the spacing S1 between the legs 8A, 8B is substantially the same near the bottom (the indicated position in FIG. 6), as near the base 11, near the upper edges 14A, 14B of the openings 9A, 9B. The base 11 is curved in the embodiment of FIG. 6, while the legs 8B, 8A are substantially straight. The legs 8A, 8B are directed substantially downwards.

The above described shapes for a suspension part 3, 50, 60 are not to be seen as limiting in any sense and yet other shapes are conceivable for a person skilled in the art, to obtain a suspension part 3 comprising two legs 8A, 8B, both legs 8A, 8B comprising an opening 9A, 9B to receive the hook portion 7A, 7B of the hanger part 4, the spacing S1 between the legs 8A, 8B of the suspension part 3, in an unloaded state, being smaller than the spacing S2 between the hook portions 7A, 7B of the hanger part 4, said suspension part 3 being adapted to be connectable with a suspension rod 10 at a base 11 of the suspension part 3, wherein the suspension part 3 further comprises guiding tabs 12A, 12B, said guiding tabs 12A, 12B extending inwardly with respect to the legs 8A, 8B, said guiding tabs 12A, 12B being bent away from the legs 8A, 8B.

One commonality between the shapes of the different suspension parts 3, 50, 60 in the embodiments of FIGS. 4, 5, 6 is that the spacing S1 between the legs 8A, 8B is at least as wide near the bottom of the legs 8A, 8B as near the base 11. This is preferred; when this spacing S1 would be smaller near the bottom of the legs 8A, 8B than near the base 11, it would be more difficult to suspend the hanger part 4 from the suspension part 3, 50, 60. Such a shape is however possible and will result in a working pipe hanger.

Further visible in the embodiments of FIGS. 4, 5, 6 is that the suspension parts 3, 50, 60 comprise a passage 17. This passage 17 allows the suspension part 3, 50, 60 to be connected to a suspension rod, for example a threaded suspension rod 10 as visible in FIG. 1.

FIGS. 3A-3E show how a pipe hanger according to the invention is typically installed, i.e., how a hanger part 4 according to the invention is suspended from a suspension part 3 according to the invention.

FIGS. 3A-3E show a suspension part 3 and a substantially U-shaped hanger part 4. The hanger part 4 comprises a loop portion 20 with two limbs 5, 6, which limbs 5, 6 are resiliently moveable towards each other. Each limb 5, 6 comprises an outwardly extending hook portion 7A, 7B for suspending the hanger part 4, in use, from the suspension part 3. The suspension part 3 comprises two legs 8A, 8B, both legs 8A, 8B comprising an opening 9A, 9B to receive the hook portion 7A, 7B of the hanger part 4. As visible in FIG. 3A, which shows a hanger part 4 according to the invention in its unloaded state, the spacing S1 between the legs 8A, 8B of the suspension part 3, in an unloaded state, is smaller than the spacing S2 between the hook portions 7B, 7B of the hanger part 4. The suspension part 3 is adapted to be connectable with a suspension rod 10 at a base 11 of the suspension part 3. The suspension part 3 further comprises guiding tabs 12A, 12B. The guiding tabs 12A, 12B are connected to the legs 8A, 8A and bend inwardly with respect to the legs 8A, 8B, so as to extend under an angle with respect to the legs 8A, 8B.

In FIG. 3B, the hanger part 4 is positioned below the suspension part 3. The limbs 5, 6 of the hanger part 4 have a spacing S3 between top sides of the hook portions 7A, 7B of the hanger part 4. This spacing S3 should be smaller than the spacing S1 between the legs 8A, 8B of the suspension part 3 to allow the suspension part 3 to be introduced between the legs 8A, 8B of the hanger part 4.

Not visible in FIGS. 3A-3E is a pipe 2 that is arranged near the bottom side of the hanger part 4. There are in principle two ways to arrange the pipe 2 in the hanger part 4. A first way is to bring the hanger part 4 to an end portion of the pipe 2, place the pipe 2 in the hanger part 4 and slide the hanger part 4 towards its desired position along the longitudinal axis of the pipe 2. This way makes it relatively easy to arrange the pipe 2 inside the hanger part 4, but requires a substantial amount of work to slide the hanger part 4 to its desired position; especially if the pipe 2 is of some length, say a meter or longer, or when the pipe 2 is relatively heavy, say heavier than 10 kg.

Another way to arrange the pipe 2 inside the hanger part 4 is to spread the limbs 5, 6 of the hanger part 4 apart, such that the pipe 2 can be moved through the opening between the limbs 5, 6 of the hanger part 4, and can be contained near the bottom of the hanger part 4. When the pipe 2 is arranged inside the hanger part 4, the limbs 5, 6 can be moved back towards each other. Before the hooks 7A, 7B of the hanger part 4 are brought between the legs 8A, 8B of the suspension part 3, they can be pinched together to reduce the distances S2, S3. Thereby, a biasing force that is directed outwardly is introduced in the limbs 5, 6 of the hanger part 4.

Figure 3C:
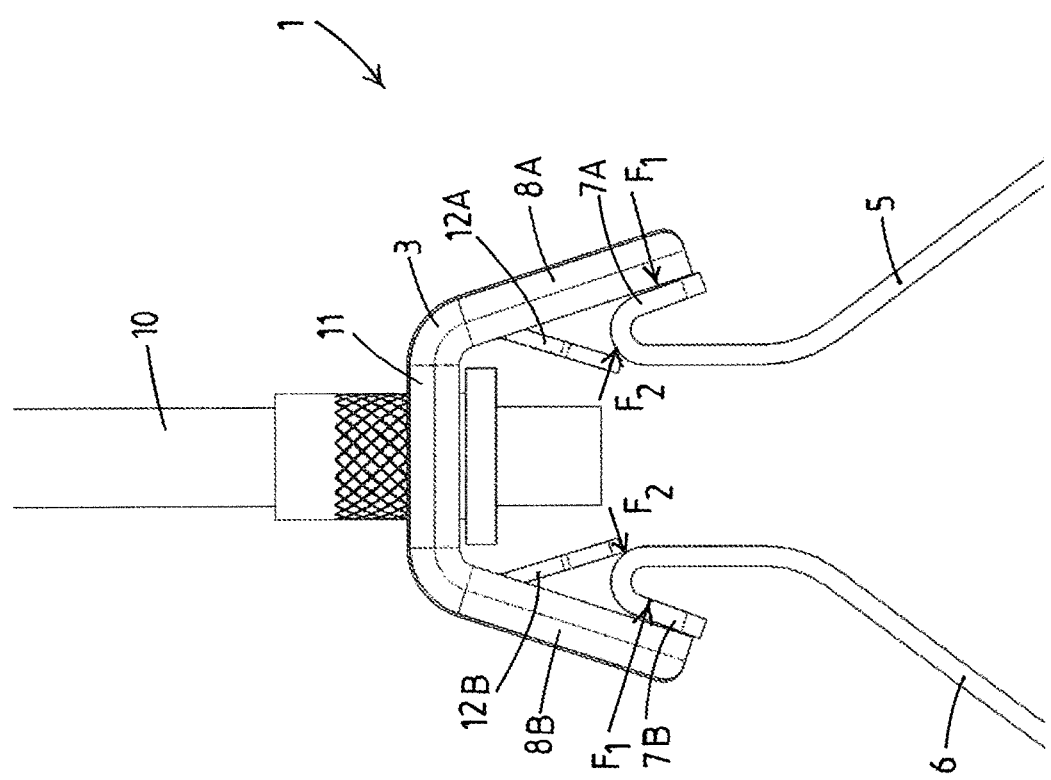
FIG. 3C schematically shows a front view of a suspension part and an upper part of a hanger part of a pipe hanger according to the invention, in a further step of suspending the hanger part from the suspension part.

In FIG. 3C, the hanger part 4 and the suspension part 3 are shown while the limbs 5, 6 of the hanger part 4 are introduced between the legs 8A, 8B of the suspension part 3. The hanger part 4 is moved upwards with respect to the suspension part 3 in comparison to the situation of FIG. 3B. In FIG. 3C, a part of the hook portion 7A, 7B is in contact with the guiding tabs 12A, 12B, and another part of the hook portion 7A, 7B is in contact with the legs 8A, 8B of the suspension part 3. Compared to the situation of FIG. 3B, the limbs 5, 6 of the hanger part 4 are closer to each other, the spacings S2, S3 being smaller. In FIG. 3C, the spacing S1 between the legs 8A, 8B of the suspension part 3 is substantially the same as the spacing S2 between the hook portions 7A, 7B of the hanger part 4. If the hanger part 4 is moved further upwards with respect to the suspension part 3, a situation in between FIGS. 3C and 3D, the spacing S2 between the hook portions 7A, 7B will generally be smaller than the spacing S1 between the legs 8A, 8B.

When the limbs 5, 6 of the hanger part 4 are moved upwards into the legs 8A, 8B of the suspension part 3, the limbs 5, 6 are biased to move outwards. As visible in FIG. 3C, when the limbs 5, 6 are moved upwards with respect to the legs 8A, 8B, a first force F1 is introduced on the hook portion 7A, 7B of the hanger part 4 by the legs 8A, 8B as a result, causing further natural stresses in the hanger part 4. The first force F1 is inwardly acting with respect to the legs 8A, 8B of the suspension part, forcing the limbs 5, 6 of the hanger part 4 to move towards each other. The legs 8A, 8B of the suspension part 3 initially resiliently force the limbs 5, 6 of the hanger part 4 towards each other.

Further visible in FIG. 3C, is that the guiding tabs 12A, 12B catch the limbs 5, 6 of the hanger part 4. The guiding tabs 12A, 12B introduce a second force F2 on the hook portions 7A, 7B of the hanger part 4. The second force F2 is outwardly acting with respect to the guiding tabs 12A, 12B of the suspension part, forcing the limbs 5, 6, more specifically: the hook portions 7A, 7B, of the hanger part 4, to move away from each other. The guiding tabs 12A, 12B of the suspension part 3, in cooperation with the inherent resiliency of the hanger part 4, force the limbs 5, 6 of the hanger part 4 towards the openings 9A, 9B in the legs 8A, 8B of the suspension part, away from each other.

Figure 3D:
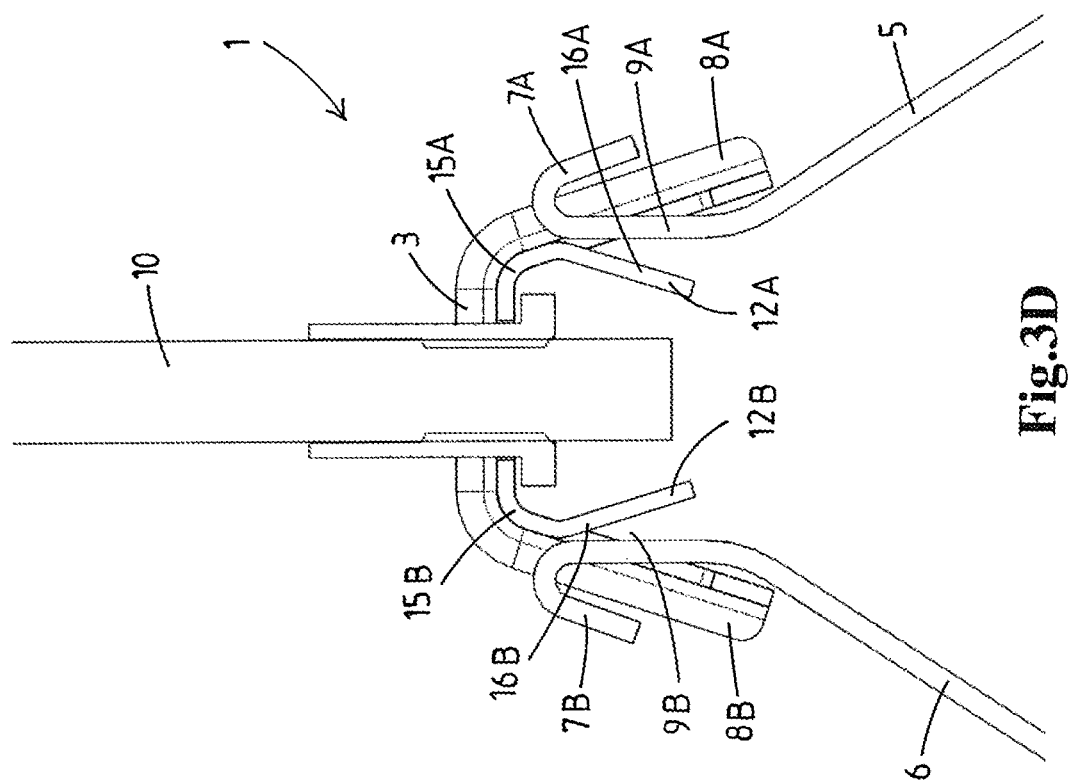
FIG. 3D schematically shows a front cross-sectional view of a suspension part and an upper part of a hanger part of a pipe hanger according to the invention, in a further step of suspending the hanger part from the suspension part.

Comparing FIG. 3D with FIG. 3C, it can be seen that the hook portions 7A, 7B are moved outwardly by the guiding tabs 12A, 12B. The limbs 5, 6 of the hanger part 4 are caught by the guiding tab 12A, 12B and are guided outwardly, to move the limbs 5, 6 away from each other. The hook portions 7A, 7b are forced through the empty space between the guiding tabs 12A, 12B and the openings 9A, 9B in the legs 8A, 8B, until the hook portions 7A, 7B are completely moved beyond the lower edge 13A, 13B of the opening 9A, 9B, after which the biasing force present in the hanger part 4 cause the limbs 5, 6 of the hanger part 4 to move outwardly and through the openings 9A, 9B. The hook portions 7A, 7B of the hanger part 4 are resiliently moved outwardly again, the hook portions 7A, 7B moving through the openings 9A, 9B in the suspension part 3. This latter state, in which the hook portions 7A, 7B move resiliently outwardly, is visible in FIG. 3D.

In one embodiment (not shown), the hook portions 7A, 7B of the hanger part 4 are made of a resilient material.

When the hook portions 7A, 7B of the hanger part 4 are made of a resilient material, the hook portions 7A, 7B will be squeezed towards the limbs 5, 6 of the hanger part 4 as the hanger part 4 is introduced in the suspension part 3 and moved upwards. The forces F1, respectively F2 will act on the hook portions 7A, 7B to press them inwardly, and act on the limbs 5, 6 to press them outwardly. This results in the hook portions 7A, 7B being squeezed towards the limbs 5, 6, allowing the hanger part 4 to move through a relatively small space between the legs 8A, 8b of the suspension part 3 and the guiding tabs 12A, 12B.

In the situation shown in FIG. 3D, the forces F1, F2 on the hook portions 7A, 7B and the limbs 5, 6 are absent or very small compared to the situation shown in FIG. 3C.

In FIG. 3E, the respective hook portions 7A, 7B of the limbs 5, 6 are guided down with respect to FIG. 3D, towards the lower edge 13A, 13B of each respective opening 9A, 9B in the legs 8A, 8B. When the respective hook portions 7A, 7b have moved through the respective openings 9A, 9B in the suspension part 3, the hanger part 4 moves downwards again, arranging the hook portions 7A, 7B around the edges 13A, 13B of the openings 9A, 9b. Except for the gravitational force that is acting on the hanger part 4 (and on the pipe 2 arranged in the hanger part 4), there are no forces acting on the hanger part 4, moving the hanger part down towards the edges 13A, 13B of the openings 9a, 9B. In FIG. 3E, the hanger part 4 is suspended from the suspension part 3.

Comparing FIG. 3E to FIG. 3A, it is observed that the spacing S2 between the hook portion 7A, 7B is smaller in FIG. 3E than in FIG. 3A. More specifically, the spacing S2 of the hanger part 4 is smaller in the mounted state of FIG. 3E than in the unloaded state of FIG. 3A. This is preferred, but not necessary for the invention. When the spacing S2 between the hook portion 7A, 7B is smaller in mounted position than in unloaded position, the hanger part 4 will still have the natural tendency to move outwardly in its mounted position, because of the introduced stresses in the hanger part 4. This is beneficial. When the pipe 2 in the hanger part 4 is installed and when an accidental impact force, for example an impact force from a side of the pipe 2 or from below the pipe 2, for example something or someone bumping into the pipe 2, causes the hanger part 4 to move up with respect to the suspension part 3, the limbs 5, 6 still have the tendency to move outwards if the spacing S2 is smaller in the mounted state than in the unloaded state. In other words, when the hook portions 7A, 7B of the hanger part 4 are no longer hooked around an edge 13A, 13B of the opening 9A, 9B but temporarily float in the opening 9A, 9B (much like the situation depicted in FIG. 3D), the limbs 5, 6 are biased outwardly. Accidental disengagement of the suspension part 3 and the hanger part 4 during such an accidental impact force is thereby prevented. In order to disengage the two parts 3, 4 once they are installed, the limbs 5, 6 of the hanger part 4 should be moved inwardly with respect to the legs 8A, 8b of the suspension part 3; against this biased movement described above and opposite of the installation process shown in FIGS. 3A to 3E. This is a relatively complicated action to perform, and a combination of actions that will very rarely occur spontaneously or accidentally. This is an advantage, as pipe hangers are in practice rarely de-installed. Their main goal is to stay in place throughout their lifetime.

In the embodiments of FIGS. 3A-3E, mainly visible on FIG. 3D, the guiding tabs 12A, 12B of the suspension part 3 comprise a connecting portion 15A, 15B and an end portion 16A, 16B. The connecting portion 15A, 15B and the end portion 16A, 16B are angled with respect to each other, wherein the connecting portion 15A, 15B lies in the same plane as the legs 8A, 8B of the suspension part 3 and the end portion 16A, 16B extends inwardly with respect to the legs 8A, 8B.

Alternatively, the guiding tabs 12A, 12B may be substantially straight, extending in its entirety inwardly with respect to the legs 8A, 8B of the suspension part 3.

FIG. 3E shows the pipe hanger in its mounted state. In a possible embodiment, each respective guiding tab 12A, 12B of the suspension part 3 can be bent back towards its respective leg 8A, 8B after the hanger part 4 is suspended from the suspension part 3 with fingers of an installer, i.e. without the need of any tool. If the guiding tabs 12A, 12B are bent towards the legs 8A, 8B of the suspension part 3, they effectively close the respective opening 9A, 9B in the legs 8A, 8B. Once the hanger part 4 of the pipe hanger is suspended from the suspension part 3, this is advantageous as it is then virtually impossible to accidentally disengage the suspension part 3 from the hanger part 4.

The invention may be summarised by the following clauses:

1. A pipe hanger (1) for supporting a pipe (2) or the like, the pipe hanger comprising a suspension part (3) and a substantially U-shaped hanger part (4), said hanger part (4), in use, being arranged around the pipe (2), said hanger part (4) comprising a loop portion (20) with two limbs (5, 6), which limbs (5, 6) are resiliently moveable towards each other, each limb (5, 6) comprising an outwardly extending hook portion (7a, 7b) at an end thereof for suspending the hanger part (4), in use, from the suspension part (3), said suspension part (3) comprising two legs (8a, 8b), both legs (8a, 8b) comprising an opening (9a, 9b) to receive the hook portion (7a, 7b) of the hanger part (4), the spacing (s1) between the legs (8a, 8b) of the suspension part (3), in an unloaded state, being smaller than or equal to the spacing (s2) between the hook portions (7a, 7b) of the hanger part (4), said suspension part (3) being adapted to be connectable with a suspension rod (10) at a base (11) of the suspension part (3), wherein the suspension part (3) further comprises guiding tabs (12a, 12b), said guiding tabs (12a, 12b) extending inwardly with respect to the legs (8a, 8b), said guiding tabs (12a, 12b) being bent away from the legs (8a, 8b), such that, when the limbs (5, 6) of the hanger part (4) are introduced between the legs (8a, 8b) of the suspension part (3) and moved upwards, the legs (8a, 8b) of the suspension part (3) initially resiliently force the limbs (5, 6) of the hanger part (4) towards each other and, subsequently, the guiding tabs (12a, 12b) of the suspension part (3) catch the limbs (5, 6) of the hanger part (4) and guide them outwardly, to move them away from each other, guiding the respective hook portions (7a, 7b) of the limbs (5, 6) towards an edge (13a, 13b) of each respective opening (9a, 9b) in the legs (5, 6), to arrange the hook portion (7a, 7b) around the edge (13a, 13b) of the opening (9a, 9b), thereby suspending the hanger part (4) from the suspension part (3).

2. The pipe hanger according to clause 1, wherein the guiding tabs (12a, 12b) are connected to an upper edge (14a, 14b) of the opening (9a, 9b) in the legs (8a, 8b) of the suspension part (3).

3. The pipe hanger according to clause 1 or 2, wherein the suspension part (3) is made from a resilient material.

4. The pipe hanger according to one of the preceding clauses, wherein the hook portions (7a, 7b) of the hanger part (4) are made from a resilient material.

5. The pipe hanger according to one of the preceding clauses, wherein the suspension part (3) comprises a base

(11) and multiple legs (8a, 8b), said base (11), in mounted position, being arranged substantially perpendicular to a central axis of the threaded rod (10), said legs (8a, 8b) of the suspension part (3) being angled with respect to the base (11) of the suspension part (3), and, in their mounted position, extend substantially downwards.

6. The pipe hanger according to one of the preceding clauses, wherein each respective edge (13a, 13b) of the openings (9a, 9b) in the suspension part (3) around which the respective hook portions (7a, 7b) of the hanger part (4) are arranged, is substantially straight.

7. The pipe hanger according to one of the preceding clauses, wherein each respective guiding tab (12a, 12b) of the suspension part (3) can be bent towards its respective leg (8a, 8b) after the hanger part (4) is suspended from the suspension part (3) with fingers of an installer, i.e. without the need of any tool.

8. The pipe hanger according to one of the preceding clauses, wherein the guiding tabs (12a, 12b) of the suspension part (3) comprise a connecting portion (15a, 15b) and an end portion (16a, 16b), the connecting portion (15a, 15b) and the end portion (16a, 16b) being angled with respect to each other, wherein the connecting portion (15a, 15b) lies in the same plane as the legs (8a, 8b) of the suspension part (3) and the end portion (16a, 16b) extends inwardly with respect to the legs (8a, 8b).

9. The pipe hanger according to one of the preceding clauses, wherein the base (11) of the suspension part (3) comprises a passage (17) for a suspension rod (10), e.g. a threaded rod.

The invention claimed is:

1. A pipe hanger for supporting a pipe or the like, the pipe hanger comprising a suspension part and a substantially U-shaped hanger part, said hanger part, in use, being arranged around the pipe, said hanger part comprising a loop portion with two limbs, which limbs are resiliently moveable towards each other, each limb comprising an outwardly extending hook portion at an end thereof for suspending the hanger part, in use, from the suspension part, said suspension part comprising a base and two legs, said suspension part being adapted to be connectable with a suspension rod at the base of the suspension part, and said legs each extending from said base towards a distal end remote from the base, both legs comprising an opening to receive the hook portion of the hanger part, wherein there is a spacing between the inner sides of the distal ends of the legs of the suspension part, which spacing, in an unloaded state, is smaller than or equal to the spacing between outward extremities of the hook portions of the hanger part, the suspension part further comprises guiding tabs, said guiding tabs extending inwardly with respect to the legs, said guiding tabs being bent away from the legs, such that, when the limbs of the hanger part are introduced between the legs of the suspension part and moved upwards, the legs of the suspension part initially resiliently force the limbs of the hanger part towards each other and, subsequently, the guiding tabs of the suspension part catch the limbs of the hanger part and guide them outwardly, to move them away from each other, guiding the respective hook portions of the limbs towards an edge of each respective opening in the legs, to arrange the hook portion around the edge of the opening, thereby suspending the hanger part from the suspension part.

2. The pipe hanger according to claim 1, wherein the guiding tabs are connected to an upper edge of the opening in the legs of the suspension part.

3. The pipe hanger according to claim 1, wherein the suspension part is made from a resilient material.

4. The pipe hanger according to claim 1, wherein the hook portions of the hanger part are made from a resilient material.

5. The pipe hanger according to claim 1, wherein said base, in mounted position, being arranged substantially perpendicular to a central axis of the suspension rod, said legs of the suspension part being angled with respect to the base of the suspension part, and, in their mounted position, extend substantially downwards.

6. The pipe hanger according to claim 1, wherein each respective edge of the openings in the suspension part around which the respective hook portions of the hanger part are arranged, is substantially straight.

7. The pipe hanger according to claim 1, wherein each respective guiding tab of the suspension part can be bent towards its respective leg after the hanger part is suspended from the suspension part with fingers of an installer, i.e. without the need of any tool.

8. The pipe hanger according to claim 1, wherein the guiding tabs of the suspension part comprise a connecting portion and an end portion, the connecting portion and the end portion being angled with respect to each other, wherein the connecting portion lies in the same plane as the legs of the suspension part and the end portion extends inwardly with respect to the legs.

9. The pipe hanger according to claim 1, wherein the base of the suspension part comprises a passage for a suspension rod, e.g. a threaded rod.

* * * * *